United States Patent

[11] 3,577,603

| [72] | Inventors | Clifford Alexander Seckerson<br>Iver Heath;<br>Robert C. Collyer, Harefield, England |
|---|---|---|
| [21] | Appl. No. | 861,749 |
| [22] | Filed | Sept. 29, 1969 |
| [45] | Patented | May 4, 1971 |
| [73] | Assignee | United-Carr Incorporated<br>Boston, Mass. |
| [32] | Priority | Oct. 2, 1968, Oct. 22, 1968, Nov. 11, 1968,<br>June 27, 1969 |
| [33] | | Great Britain |
| [31] | | 46829/68, 50022/68, 53225/68 and<br>32682/69 |

[54] FASTENER
13 Claims, 15 Drawing Figs.

[52] U.S. Cl. ..................................................... 24/73,
85/5
[51] Int. Cl. ...................................................... F16b 21/00,
A44b 21/00
[50] Field of Search .......................................... 85/5;
24/208 (A), 90 (F), 213 (R), 216, 213 (CS), 73.8
(P), 73 (FT), 73 (PF)

[56] References Cited
UNITED STATES PATENTS
3,393,431  7/1968  Saunders ..................... 24/73PF FOREIGN PATENTS
6,611,949  2/1968  Netherlands ................. 24/90RP

*Primary Examiner*—Donald A. Griffin
*Attorney*—Philip E. Parker

ABSTRACT: A two-part fastener for attaching two apertured panels together so that one panel is readily removable from the other, the fastener comprising a stud portion having a shank adapted for snap engagement rough a circular aperture in one of the panels, a flange at one end of the shank adapted to abut the outer surface of the said one panel to limit insertion of the shank therethrough and a stud projecting from the opposite side of the flange from the shank and adapted to project outwardly through a circular aperture in the other panel when the other panel is resting on the flange of the stud portion and a socket portion formed with a bore open at one end shaped to receive the stud of the stud portion and with an external flange which is spaced from the said one end of the bore and adapted to clamp the said other panel against the said flange of the stud portion, the stud and the bore in the socket portion being provided with means which interengage when the stud is within the bore to resist withdrawal of the socket portion from the stud.

PATENTED MAY 4 1971  3,577,603

INVENTORS
Clifford Alexander Seckerson
Robert C. Collyer
by Philip E. Parker
Attorney.

3,577,603

INVENTORS
Clifford Alexander Seckerson
Robert C. Collyer
by Philip E. Parker
Attorney.

3,577,603

FASTENER

BACKGROUND TO THE INVENTION

The present invention relates to a two-part fastener for attaching two apertured panels together.

It is known to provide a unitary fastener for attaching two apertured panels together, the fastener comprising a shank portion which is snap engageable through an aperture in one panel and a head portion having a pair of flanges which is engageable in a keyhole slot in the other panel. This known type of fastener is particularly useful when the outer surface of the panel formed with the keyhole slot is covered with an imperforate material and the head of the fastener must be applied from the inner blind side of the slotted panel.

However, there are many occasions when the head of the fastener does not have to be applied blind to the slotted panel and when it is essential that the panel should be removable from the fastener without the necessity for sliding the head of the fastener along the length of the keyhole slot. It is an object of the present invention to provide a fastener which meets these requirements.

SUMMARY OF THE INVENTION

A two part fastener for attaching two apertured panels together, comprising a stud portion and a socket portion, the stud portion comprising a shank adapted to engage through an aperture in one of the panels, a flange at one end of the shank adapted to abut the outer surface of the said one panel to limit insertion of the shank therethrough and a stud projecting from the opposite side of the flange from the shank, the socket portion being formed with a bore open at one end to receive the stud of the stud portion and with a flange which is spaced from the said one end so as to limit insertion of the socket through the aperture in the other panel, wherein the stud and the socket portion are provided with means which interengage when the stud is inserted into the bore in the socket to resist withdrawal of the stud from the bore.

DESCRIPTION OF THE PREFERRED EMBODIMENT

Figure 6:
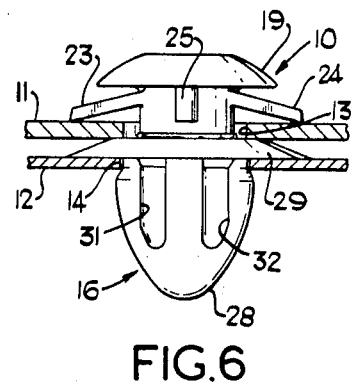
FIG. 6 is an elevation, partly in section, showing the stud and socket portions of FIGS. 1 to 5 attaching an apertured trim pad to the apertured support panel.

In FIG. 6, a two-part fastener is indicated generally at 10 attaching a trim pad 11 to a support panel 12, the trim pad being formed with an aperture 13 and the support panel being formed with an aperture 14.

Figure 1:
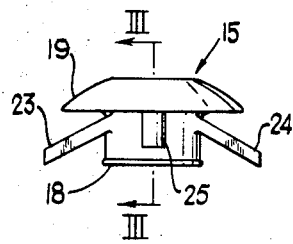
FIG. 1 is an elevation of a socket portion of a two-part fastener according to the present invention.
Figure 2:
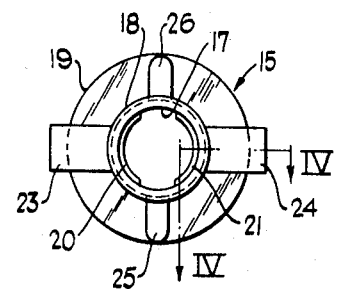
fig. 2 is an underplan of the socket portion of FIG. 1.
Figure 3:
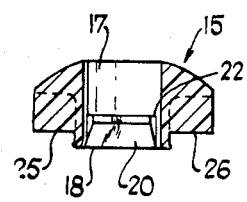
FIG. 3 is a section taken on the line III–III of FIG. 1.
Figure 4:
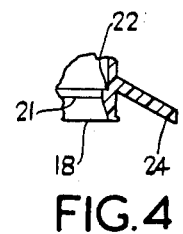
FIG. 4 is a section taken on the line IV–IV of FIG. 2.
Figure 5:
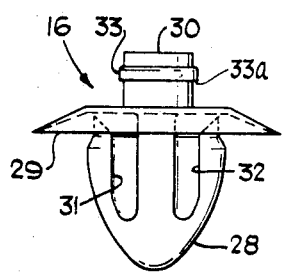
FIG. 5 is an elevation of a stud portion of a fastener according to the present invention.

The fastener 10 comprises a socket portion which is indicated generally at 15 in FIGS. 1 to 4 and a stud portion which is indicated generally at 16 in FIG. 5. Both the socket portion and the stud portion are preferably formed from a suitable synthetic plastics material such as nylon or an acetal resin by injection moulding.

The socket portion 15 is formed with a bore 17 which extends into the socket from an end 18 of the socket and with a flange 19 at the other end of the socket in the shape of a button head. Internally, the bore 17 is formed with two part-annular projections 20 and 21 which taper inwardly from the end 18 of the socket and which thus form a tapered entry for the bore 17 and a part-annular wall or recess 22 which is spaced from the entry end of the bore. Externally, the socket 15 is formed with two resilient lugs 23 and 24 which extend downwardly and outwardly in opposite directions from the undersurface of the flange 19 and with relatively nonresilient abutments 25 and 26 which extend outwardly from opposite sides of the socket, beneath the flange 19 in a direction perpendicular to the direction of the lugs 23 and 24. The abutments 25 and 26 extend downwardly from the flange 19 but terminate terminate nearer the flange 19 than the lugs 23 and 24.

The stud portion 1 is pressed through the circular aperture 14 in the support panel 12 until the flange 29 is flattened slightly against the upper surface of the panel 12 and the rim of the aperture 14 is clamped against the shoulders on the shank 28. The trim pad 11 is then brought up to the support panel so that the stud 30 projects through the circular aperture 13 in the trim pad and the trim pad rests on the flange 29. Finally, the socket portion 15 is brought up to the stud 30 and pressed downwardly over the stud 30 until the rib 33 locks behind the projections 20, 21. In this position, the resilient lugs 23, 24 are flattened slightly against the upper surface of the trim pad 11 to hold the trim pad firmly against the flange 29. The abutments 25, 26 prevent too much pressure being applied to the socket portion 15 and damaging the resilient lugs 23, 24 by contacting the upper surface of the trim pad 11 and limiting downward movement of the socket portion 15.

It will be appreciated that a plurality of the fasteners 10 will be used to attach a trim pad of any substantial size to the support panel 12, the trim pad preferably being formed with a series of circular apertures adjacent its periphery to receive the stud 30 of each fastener.

It at any time it is necessary to remove the trim pad 11 from the support panel 12, this can be done quickly and easily by pulling the trim pad 11 away from the support panel 12 so as to withdraw the shanks 28 of the fasteners from the panel. The trim pad is thus dismounted from the panel leaving the fasteners 10 in situ and can be quickly remounted on the panel when required.

Figure 7:
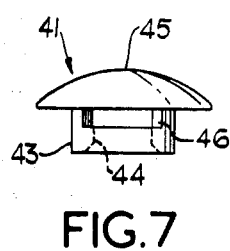
FIG. 7 is an elevation of a socket portion of a fastener forming a further embodiment of the invention.
Figure 8:
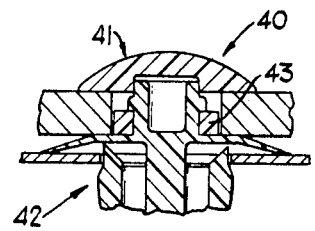
FIG. 8 is a section through an assembly of the socket portion of FIG. 7 and an associated stud portion attaching a trim pad to a support panel.

In FIGS. 7 and 8, a fastener is indicated generally at 40, the fastener 40 comprising a further embodiment of the present invention. The fastener 40 comprises a socket portion 41 which is shown in FIG. 7 and a stud portion 42 which is identical to the stud portion 16 of the fastener 10.

The socket portion 41 comprises a tubular portion 43 formed with a bore 44 and a flange 45 in the form of a solid button head.

The wall of the tubular portion 43 is formed with two diagonally arranged slots 46 and 47 adjacent the undersurfaces of the flange 45.

In use, the socket portion 41 is pressed over the projecting stud of the stud portion 42 until the rib on the stud of the stud portion 42 snap engages into the diagonally arranged slots 46 and 47 in the wall of the tubular portion 43 of the socket 41. As the stud of the stud portion 42 enters the bore 44 in the socket portion, the wall of the socket portion is deformed and expanded outwardly until the rib snaps into the slots 46 and 47.

In all other respects, the fastener 40 is similar to the fastener 10 and is used in the same manner.

Figure 9:
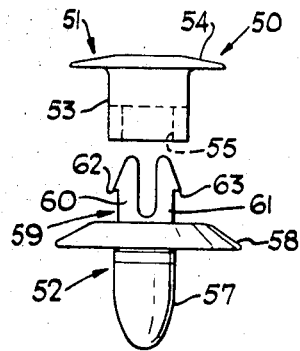
FIG. 9 is an elevation of a two-part fastener forming a further embodiment of the invention.
Figure 10:
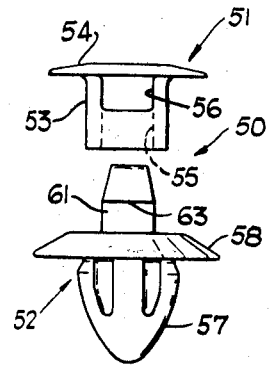
FIG. 10 is a side elevation of the fastener of FIG. 9.

A two-part fastener forming a further embodiment of the invention is indicated generally at 50 in FIGS. 9 and 10. The two-part fastener 50 comprises a socket portion 51 and a stud portion 52, both of which portions are formed from a suitable synthetic plastics material by injection moulding. The socket portion comprises a tubular portion 53 having an annular flange 54 at one end and a bore 55 extending into the other end. Two similar slots 56 are formed in the wall of the tubular portion 53 adjacent the flange 54.

The stud portion 52 comprises a shank 57 which is similar to the shank 28 of the fastener 10, a flange 58 and a stud 59 which projects upwardly from the opposite side of the flange 58 and coaxially with the shank 57. The stud 59 comprises a pair of resilient tongues 60, 61 each of which is formed with an external shoulder 62, 63 respectively.

The socket portion 51 is a press fit over the stud 59 and as the stud 59 enters the bore 55 in the socket portion 51, the tongues 60, 61 are pinched together until the shoulders 62, 63 snap engage outwardly into the diagonally arranged recesses 56 formed in the wall of the socket portion. Thereafter the shoulders 62, 63 resist withdrawal of the socket portion from the stud. It will be understood that the two-part fastener 50 is used in the same manner as the fasteners 10 and 40 to attach two apertured panels together.

Figure 11:
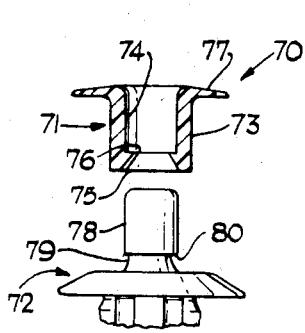
FIG. 11 is an elevation, partly in section, of a detail of a fastener forming yet a further embodiment of the invention.
Figure 12:
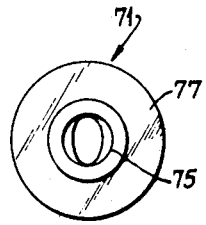
FIG. 12 is an underplan of a socket portion of the fastener of FIG. 11.

Yet a further embodiment of the invention is shown in FIGS. 11 and 12 which illustrate a two-part fastener 70 comprising a socket portion 71 and a stud portion 72.

The socket portion comprises a tubular portion 73 having a through bore 74 which is tapered inwardly at its leading end 75 and formed with a shoulder 76 adjacent its leading end 75, and a flange 77 at the end of the tubular portion opposite to the entry end 75.

The stud portion 72 is similar to the stud portion 16 of the fastener 10 except that it is provided with a cylindrical stud 78 formed with a recess 79 adjacent the flange of the stud portion, the recess 79 forming an annular shoulder 80 which faces the flange of the stud portion.

As shown in FIG. 12, the bore 74 in the socket portion 71 is circular at the entry end 75 but tapers towards an oval cross section at the shoulder 76. As the socket portion 71 is forced over the stud 78, the stud enters the circular entry end 75 of the bore 74 and then progressively deforms the wall of the socket portion until the shoulder 76 snaps behind the shoulder 80 on the stud. Thereafter, the interlocking of the shoulders 76 and 80 resist withdrawal of the socket portion from the stud portion.

In an alternative modification of the fastener 70, the bore 74 can taper from the entry end 75 uniformly so that the entry end is frustoconical and tapers towards a minimum circular cross section.

Figure 13:
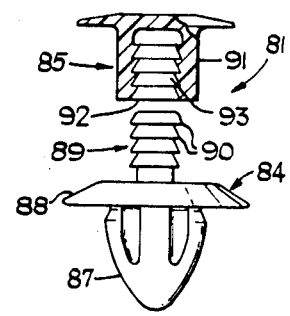
FIG. 13 is an elevation of a two-part fastener forming a further embodiment of the invention.
Figure 14:
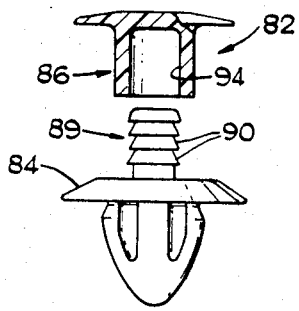
FIG. 14 is an elevation, partly in section, of a modification of the fastener of FIG. 13, and, FIG. 15 is an elevation partly in section of a further modification of the embodiment of FIG. 13.
Figure 15:
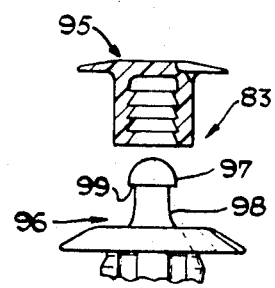

In FIGS. 13 to 15, three further embodiments of the invention are illustrated, the further embodiments comprising fasteners 81, 82 and 83 respectively.

Both of the fasteners 81 and 82 comprise similar stud portions 84 and socket portions 85 and 86 respectively.

The stud portion 84 comprises a shank 87, flange 88 and stud 89, the shank 87 and flange 88 being similar to the shank and flange of the stud portion 16 of the fastener 10. The stud 89 is generally cylindrical and formed with a series of annular serrations 90 which taper towards the tip of the stud.

The socket portion 85 comprises a tubular portion 91 having a bore 92 formed with annular serrations 93 which are complementary to the serrations 90 on the stud 89 and in use the stud 89 is a force fit into the bore 92 of the socket portion 85, the serrations 90 and the serrations 93 interlocking to retain the socket portion on the stud 89.

The socket portion 86 of the fastener 82 is similar to the socket portion 85 except that it is formed with a bore 94 having a smooth cylindrical surface of slightly smaller diameter than the maximum diameter of the stud 89 so that, when the socket portion 86 is forced over the stud 89, the serrations 90 on the stud 89 bite into the wall of the bore 94 and provide frictional resistance to withdrawal of the socket portion from the stud.

The fastener 83 comprises a socket portion 95 which is similar to the socket portion 85, and a stud portion 96 which is similar to the stud portion 84 except that it has a stud 97 which is externally cylindrical and smooth-walled apart from a recess 98 formed adjacent the flange of the stud portion, the recess 98 providing an annular shoulder 99 which faces the flange of the stud portion. When the socket portion 95 is forced over the stud 97, one of the annular serrations formed on the inside surface of the bore in the socket portion engages behind the annular shoulder 99 to lock the socket portion on the stud. It will be seen that the series of serrations on the socket portion 95 enable the socket to be locked on the stud in a number of different positions which will vary according to the depth of the panel which is to be clamped between the socket portion and the stud portion.

It will be understood that all of the two-part fasteners described above are used in the same manner as the fastener 10 to attach together two panels each of which is formed with a circular aperture. In each case, the stud portion is attached to one of the panels with the panel clamped between the flange of the stud portion and the shank, the other panel is then placed over the projecting stud of the stud portion and the socket portion is forced downwardly over the projecting stud so that the other panel is clamped between the flange on the socket portion and the flange on the stud portion.

It will be seen, therefore, that all of the fasteners described herein provide a quick and easy way of attaching two apertured panels together in such a manner that the outer panel can be readily and easily removed and replaced without disturbing the inner or lower panel.

It will also be understood that the various features of the individual fasteners illustrated herein can be combined in any convenient way, for instance any of the fasteners illustrated in FIGS. 7 to 15 can be provided with the resilient lugs 23, 24 and abutments 25, 26 which are described with reference to the fastener 10 and likewise the stud portion of the fastener 10 may be provided with a series of serrations, similar to the serrations 90 of the stud portion 83 in place of the single rib 33.

Further minor modifications can be made to the above described embodiment without departing from the spirit and scope of the invention which is best described in the following claims.

We claim:

1. A two part fastener for attaching two apertured panels together, comprising a stud portion and a socket portion, the stud portion comprising a shank adapted to engage through an aperture in one of the panels, a flange at one end of the shank adapted to abut the outer surface of the said one panel to limit insertion of the shank therethrough and a stud projecting from the opposite side of the flange from the shank, the socket portion being formed with a bore open at one end to receive the stud of the stud portion and with a flange which is spaced from the said one end so as to limit insertion of the socket through the aperture in the other panel, wherein the stud and the socket portion are provided with means which interengage when the stud is inserted into the bore in the socket to resist withdrawal of the stud from the bore.

2. A fastener as claimed in claim 1, wherein the stud is formed with an annular shoulder facing the flange on the stud portion and a recess is formed in the wall of the bore in the socket to receive the said shoulder.

3. A fastener as claimed in claim 2, wherein the said shoulder comprises a face of an annular rib provided on the stud.

4. A fastener as claimed 3, wherein two diagonally arranged slots are formed through the wall of the socket to receive the annular rib.

5. A fastener as claimed in claim 1, wherein the stud is formed with a recess and the socket is formed with a projection extending radially inwardly from the wall of the bore which engages in the recess in the stud.

6. A fastener as claimed in claim 5, wherein the said recess is an annular recess and the said rib is an annular rib.

7. A fastener as claimed in claim 5, wherein the stud is generally cylindrical and formed with a circumferential recess and the socket is formed with a circumferential rib on the wall of the bore, the periphery of the rib being generally oval and adapted to deform as the stud is forced into the bore and snap engage into the recess.

8. A fastener as claimed in claim 1, wherein the stud is provided with a series of annular serrations which engage the wall of the bore in the socket.

9. A fastener as claimed in claim 8, wherein the wall of the bore in the socket is formed with a series of annular serrations which mate with the serrations on the stud.

10. A fastener as claimed in claim 1, wherein the wall of the bore in the socket is formed with a series of annular serrations which engage on the stud.

11. A fastener as claimed in claim 1, wherein the stud comprises two or more tongues which are resiliently pinched together within the bore in the socket to provide frictional resistance to withdrawal of the stud from the socket.

12. A fastener as claimed in claim 11, wherein each tongue is formed with an external shoulder and the socket is provided with two or more recesses in the wall of the bore each of which is adapted to receive and interengage with a shoulder on a tongue.

13. A fastener as claimed in claim 1, wherein two or more resilient lugs project outwardly and downwardly from the flange on the socket portion, the lugs being adapted to apply pressure against the upper surface of the said other panel.

UNITED STATES PATENT OFFICE
CERTIFICATE OF CORRECTION

Patent No. 3,577,603      Dated May 4, 1971

Inventor(s) Clifford Alexander Seckerson et al.

It is certified that error appears in the above-identified patent and that said Letters Patent are hereby corrected as shown below:

Column 2, line 22, cancel "terminate", second occurrence; line 24, after "portion" cancel "1" and insert -- 16 comprises a shank 28, which is adapted to snap engage through the circular aperture 14 in the support panel 12, a flange 29 in the form of a flexible frusto-conical skirt which surrounds the upper end of the shank 28 and a stud 30 which projects from the opposite side of the flange 29 to the shank 28 coaxially with the shank 28.

The shank 28 is formed with slots 31 and 32 which render it resiliently compressible and is similar to the shank of the fastener described and claimed in our co-pending British application No. 33099/67. The flange 29 is flexible and adapted to form a seal against the upper surface of the support panel 12 when the shank is engaged through the aperture 14 as shown in Figure 6. The stud 30 is cylindrical and formed with an annular rib 33, which provides an annular shoulder 33a facing the flange 29, the diameter of the stud 30 and the rib 33 being such that the stud 30 and rib 33 can be forced into the bore 17 in the socket portion 15 unitl the rib 33 snap engages past the projections 20, 21 and seats in the recess 22 formed behind the projections 20, 21 to lock the socket portion on the stud 30.

In order to make the assembly shown in Figure 6 and attach the trim pad 11 to the support panel 12, the shank 28 of the stud portion 16 --.

Signed and sealed this 7th day of September 1971.

(SEAL)
Attest:

EDWARD M. FLETCHER, JR.      ROBERT GOTTSCHALK
Attesting Officer      Acting Commissioner of Patents